UNITED STATES PATENT OFFICE.

ADOLPHUS SPIEGEL, OF HÖCHST-ON-THE-MAIN, GERMANY, ASSIGNOR TO THE FARBWERKE, VORMALS MEISTER, LUCIUS & BRÜNING, OF SAME PLACE.

PREPARATION OF PHENETO-SULPHO-DIAZO-BETA-NAPHTHOL WITH BISULPHITE COMPOUND.

SPECIFICATION forming part of Letters Patent No. 306,969, dated October 21, 1884.

Application filed June 19, 1884. (Specimens.)

*To all whom it may concern:*

Be it known that I, ADOLPHUS SPIEGEL, doctor of philosophy, a citizen of the Empire of Germany, residing at Höchst-on-the-Main, in the Empire of Germany, have invented certain new and useful Improvements in Coloring-Matters; and I do hereby declare the following to be a full, clear, and exact description of the invention, such as will enable others skilled in the art to which it appertains to make and use the same.

My invention relates to production of a new coloring-matter which is soluble in water from an azo coloring-matter insoluble in water but soluble in spirit.

In carrying out my invention I first prepare the azo coloring matter pheneto-sulphon-disazo-beta-naphthol of the formula

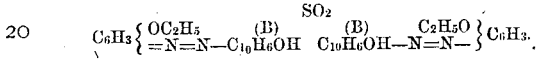

To prepare this compound I take the body diamido-phenetol-sulphon,diamido-diethyl-oxy-sulpho-benzid, $(OC_2H_5C_6H_3NH_2)2SO_2$, which is prepared by reducing the ethyl ether of dinitro-oxysulpho-benzid of Glutz, (Annalen 147.59.) The diamido-phenetol-sulphon is diazotized in the well-known manner, and the disdiazo-phenetol-sulphon is combined with twice the molecular quantity of beta-naphthol, according to the method well known to chemists, thereby producing an orange-colored azo coloring-matter, phenetol-sulphon-disazo-beta-naphthol. This compound is distinguished by being insoluble in water, but soluble in various other mediums, such as hot spirits of wine. The color is hardly changed after the addition of caustic soda to the solution.

In order to convert this azo coloring-matter first defined into the new coloring-matter soluble in water, I proceed in the following manner: I take, say, fourteen pounds of the compound thus obtained, in the shape of a paste or a fine powder, and thereunto add, say, one hundred-weight of spirits of wine, along with, say, twenty-eight pounds of a concentrated solution of the bisulphite of an alkali. The mixture is now in a closed vessel, or in one supplied with a reversed cooler, heated upon the water bath until the orange-colored compound previously mentioned in suspension has made room for the yellow crystals of the bisulphite compound suspended in a yellow solution of the same, which will be the case after two or more hours, care being taken to stir well. The alcohol is now distilled off and the residual yellow crystalline mass allowed to cool. The crystals are separated from the suspending-liquid by filtration, and now represent the bisulphite compound desired, ready for use in the shape of a powder or paste.

The bisulphite compound is soluble in water with a yellow color. When an alkali is added to the yellow solution, or when it is boiled with a nitrite, the compound, being a bisulphite, is easily decomposed and the orange-colored compound above mentioned is precipitated.

Having thus described my invention, what I claim as new, and desire to secure by Letters Patent, is—

A new product, the coloring-matter herein described, it being the bisulphite compound of phenetol-sulphon-disazo-beta-naphthol having the characteristics substantially as set forth.

In testimony whereof I affix my signature in presence of two witnesses.

ADOLPHUS SPIEGEL.

Witnesses:
F. VOGELER,
A. S. HOGUE.